April 14, 1964  C W. MUSSER  3,128,641
POWER TRANSMISSION

Filed June 5, 1962  5 Sheets-Sheet 2

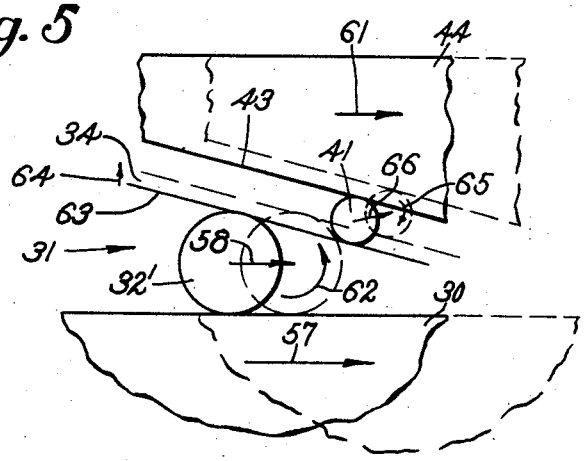
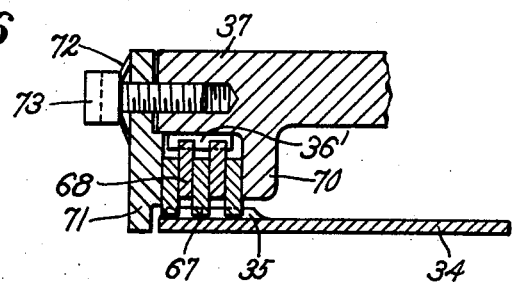
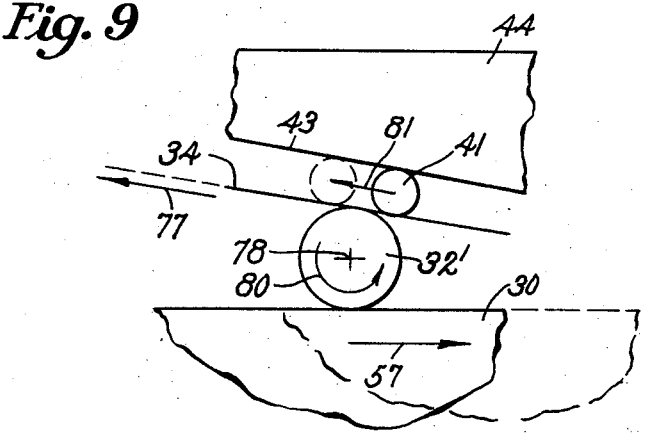

April 14, 1964  C W. MUSSER  3,128,641
POWER TRANSMISSION

Filed June 5, 1962  5 Sheets-Sheet 4

April 14, 1964     C W. MUSSER     3,128,641
POWER TRANSMISSION

Filed June 5, 1962     5 Sheets-Sheet 5

United States Patent Office 3,128,641
Patented Apr. 14, 1964

3,128,641
POWER TRANSMISSION
C Walton Musser, Palos Verdes Estates, Calif., assignor to United Shoe Machinery Corporation, Flemington, N.J., a corporation of New Jersey
Filed June 5, 1962, Ser. No. 200,130
15 Claims. (Cl. 74—640)

The present invention relates to power transmissions of the type which rotate a shape about a flextube.

A purpose of the invention is to maintain an unequal ratio between inner and outer bearings one within and one without a flextube by utilizing bearing rolling elements, suitably balls, on one of the bearings of variable diameter so as to obtain a planetary effect when rotating a non-circular shape.

A further purpose is to permit control of the motion transmitted by the rotation of the flextube, retaining the flextube stationary at some times, for example by means of a spline, and permissibly allowing the flextube to rotate at other times.

A further purpose is to rotationally position the flextube by a clutch which can either be released or engaged as desired.

A further purpose is to rotationally position the flextube by a torque limiter.

A further purpose is to drive the flextube rotationally either to increase or to diminish motion of the output.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 5 is a diagram showing how the motion is actually transferred from an input shaft to an output shaft in the device of FIGURES 1 to 4.

FIGURE 6 is a fragmentary axial section showing a brake interposed between the flextube and an anchorage such as the housing, and showing torque limiting.

FIGURE 9 is a diagram indicating a radial relationship of parts and showing the operation of a device of the invention employing a clutch of the type of FIGURE 7 with the clutch unlocked.

Figure 1:
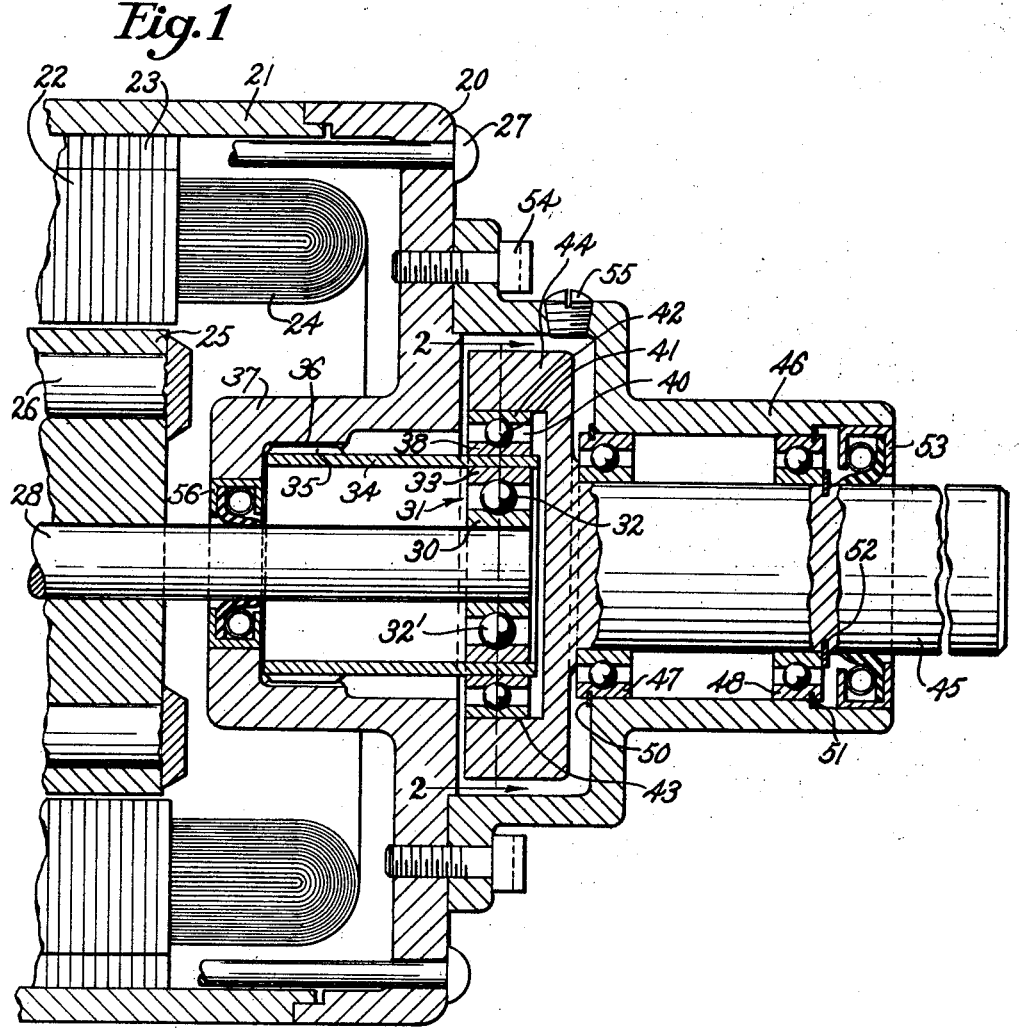
FIGURE 1 is a fragmentary longitudinal section showing a device of the invention incorporated in an end bell of an induction motor.

Describing in illustration but not in limitation and referring to the drawings:

The device of the invention makes it possible to transmit power by means of two bearings which are specially designed so that one bearing acts as a wave generator and the other bearing acts as a wave follower or accepts the driving of the wave shape from the wave generator bearing. Advantage is taken of planetary action to cause a difference in the angle traversed by the two bearings in a given time.

Thus, if we concern ourselves with a simple version of the device, a wave generator bearing is used which has balls of variable diameter so as to create planetary motion in the wave generator, causing the external race of the wave generator to be elliptoidal in shape. In this form rotation of the inner race or input about the common axis causes the shape to rotate and to propagate a sine wave along the outer race. The outer race of the wave generator bearing then causes a flextube, which in the simplest form is rotationally stationary, to assume an elliptoidal shape. This elliptoidal shape rotates around the flextube within an outer wave follower bearing, and this causes the wave follower bearing to rotate at the same speed as that at which the sine wave is propagated around the wall of the flextube.

U.S. Patent 2,943,495, granted July 5, 1960, upon an application filed in my name, for Means for Producing Motion Through Sealed Wall, shows a transmission through a hermetically sealed wall, with one bearing located within and in contact with the wall and the other bearing located outside and in contact with the wall. Both bearings of the same elliptoidal shape are in phase and in effect are locked together so that rotation of one bearing causes rotation of the other bearing on a 1:1 ratio.

The present invention on the other hand differs in that relative rotation of one of the bearings causes a progression of the wave shape in the race by means of rolling elements, suitably balls, of different diameter. Thus in effect a planetary relationship is set-up between the rotation of the input shaft and the speed at which the wave is propagated around the raceway. For example, if the inner raceway is round, and it has two balls of maximum diameter located at opposite positions creating an elliptoidal shape as the inner raceway rotates, the balls will move around the inner raceway in a planetary manner at an angular speed which is lower than the angular speed of the inner raceway. The wave is made to progress around the outer raceway at the planetary speed of the balls.

If a bearing of this type is placed against the inside of a flextube, and a bearing is placed against the outside of the flextube which has assumed the elliptoidal shape produced by the wave, rotation of the inner raceway of the inner bearing will cause the outer bearing, in this case the follower bearing, to rotate at the planetary speed of the balls. Thus it is possible to obtain a very desirable difference in speed between the driving element and the driven element.

In the above discussion, it has been assumed that the flextube is angularly stationary around the common axis. It is possible, however, to modify the motion of the follower bearing by causing the flextube to turn in the same direction as the input or in the opposite direction, either by a drive or in one case by release of a brake, or by limiting the torque of the flextube so that it will remain stationary up to a predetermined torque and rotate when the torque becomes higher.

A device embodying the invention is very useful to transmit power particularly at relatively low ratios. The lowest ratio of output to input power is approximately 2¼:1, and it can increase to a maximum of approximately 10:1. The greatest usefulness of the device of the invention is believed to be in the range of ratios between 2¼:1 and 7:1.

These ratios can be employed either in a speed decreasing manner or a speed increasing manner. For example, if the shape or flextube is the driven part, then a planetary will be the output portion and will revolve at a speed higher than the speed of the shape, whereas, if the planetary is the driving portion it will rotate at a speed lower than the speed of rotation of the input.

Considering now FIGURE 1, the entire power transmission of the invention is mounted in an end bell 20 of a conventional induction motor 21. The induction motor has a stator or field 22 with magnetically susceptible laminations 23 and windings 24 and has a squirrel cage armature 25 with current conductors 26 as well known. The end bell is fastened to the motor housing by through bolts 27 in a conventional manner. The squirrel cage armature 25 is fastened to a shaft 28 running clear through the motor by means not shown. The shaft 28 is fastened as by force fitting to inner race 30 of wave generator bearing 31. The inner race 30 is circular in cross section and has, rolling on its raceway, rolling elements 32, which are suitably balls as shown, although rollers may be used if desired.

Rolling elements 32 are of different size, varying between maximum diameter rolling elements 32' and minimum diameter rolling elements $32^2$ and including intermediate diameter rolling elements $32^3$. Depending on the number of rolling elements there may be several intermediate sizes if desired.

The number of points at which rolling elements of maximum diameter are employed around the circumference will depend upon the number of lobes on the wave generator, and while three or more such lobes may be used if desired, it will in many cases be suitable to employ two lobes at opposite positions forming an elliptoidal shape, that is, a shape which is like an ellipse.

These rolling elements 32', $32^2$ and $32^3$ roll in intimate contact with an outer race 33 of the wave generator bearing 31 in a manner similar to that in which ball bearings usually perform, but co-operating to produce a different effect.

Figure 2:
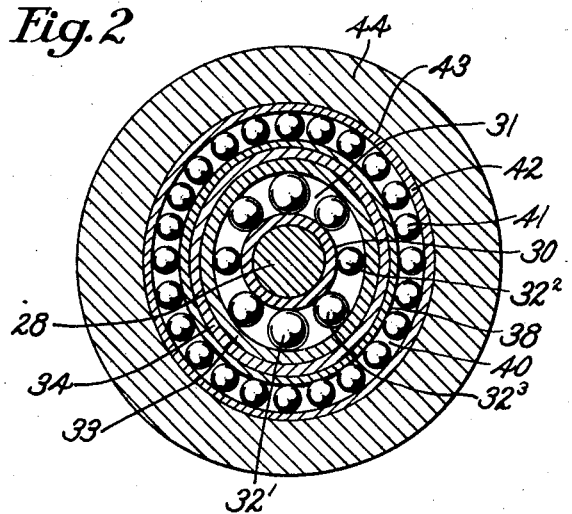
FIGURE 2 is a transverse section on the line 2—2 of FIGURE 1 showing the driving elements.

Surrounding the outer race 33 and fitting closely to it is a flextube 34 which, when relaxed, may be and suitably will be of circular cross section, but which is deflected by the bearing 31, to conform with the outer contour of the outer race 33 of the wave generator bearing which, as best seen in FIGURE 2, is an elliptoid in the preferred form.

In the simplest form, the opposite end of the flextube 34 has outwardly directed spline teeth 35 which are interengaged and splined to a set of inwardly directed spline teeth 36 of circular arrangement on the inner circumference of a reverse bell 37 in the end bell 20. Thus while the end of the flextube having the spline teeth 35 remains angularly stationary because it is intersplined with the spline teeth 36, the flextube 34 is deflected radially to carry a wave form circumferentially.

Immediately surrounding the flextube 34 in contact therewith and directly opposite the wave generator outer race 33 there is an inner race 38 of a follower bearing 40. This wave follower bearing 40 has rolling elements 41, which may be rollers, but are preferably balls as shown. In the form shown in FIGURES 1 to 5 all of the rolling elements 41 of the follower bearing are identical in diameter.

The wave follower bearing 40 has an outer race 42 which fits closely around the rolling elements 41 and also fits closely into an elliptoidal hole 43 in a wave follower 44 surrounding the wave follower bearing.

It will be seen then that the variably size balls 32', $32^2$, $32^3$ of the wave generator bearing have produced an elliptoidal shape on the outer race 33 of the wave generator bearing, on the flextube 34 and on the inner race 38 of the wave follower bearing, and these, by means of the rolling elements 41 of the wave follower bearing, completely match in elliptoidality both in respect to phase and amplitude with respect to the elliptoidal shape of the interior opening 43 on the wave follower 44, although the sizes vary from inner to outer elements.

The wave follower 44 is in effect part of a flange directly connected to the output shaft 45. The output shaft 45 turns and is mounted in a housing 46 by two antifriction bearings, suitably ball or roller bearings, 47 and 48. These antifriction bearings 47 and 48 are axially positioned in the housing 46 by two conventional snap rings 50 and 51 and the output shaft is axially positioned in these bearings by a conventional snap ring 52. An oil seal or lubrication seal 53 is provided between the output shaft and housing 46. Housing 46 is fastened to the end bell 20 by a ring of cap screws 54. An opening closed by a plug 55 is provided in the housing 46 to introduce lubricant into the bearings.

The input shaft has a lubrication seal 56 interposed between the shaft 28 and the reverse bell 37, and the entire space between the lubrication seals 53 and 56 will be filled with a proper lubricant, taking suitable precautions for venting.

FIGURE 2 is a section showing the various rolling elements of the wave generator bearing and the wave follower bearing. Here it can be clearly seen that the input shaft 28 has surrounding it a circular inner race 30 of the wave generator bearing and the differently sized rolling elements, suitably balls $32^1$, $32^2$, $32^3$, are spaced around the inner race 30 and cause the outer race 33 of the wave generator bearing to be deflected into elliptoidal shape. This shape is referred to as an elliptoid because it generally resembles an ellipse but is not strictly elliptical. By choosing appropriate variation of size for the rolling elements $32^1$, $32^2$ and $32^3$, the particular shape will be made to conform in the preferred embodiment to two sine waves superimposed on the 360° circumference of the shape. This shape together with its dynamics has been more fully described in my U.S. Patents Nos. 2,943,495 and 2,906,143 which are incorporated herein by reference.

Due to the fact there is a close fit between the outer race 33 of the wave generator bearing and the flextube 34, the flextube also assumes an elliptoidal shape. Thus in the particular form under discussion the elliptoidal shape of the flextube matches the elliptoidal shape of the outer race of the wave generator bearing. This same shape continues outwardly through the inner race of the wave follower bearing 38, through the configuration of the rolling elements 41, through the outer race 42 of the wave follower bearing, and including the elliptoidal recess or hole 43 on the inside of the wave follower 44. This elliptoidal recess 43 exactly conforms to the deflected shape of the elliptoid. Accordingly the outer race 42 of the wave follower bearing fits snugly within the wave follower 44 and is in close contact throughout its circumference with the elliptoidal shape on the inside of the opening 43 of the wave follower. Accordingly there is very little radial play in the bearing combination, and with normal standards of fit on the bearings there is very little axial play.

It will be evident that all of these elliptoidal shapes, or other non-circular shapes where three or more lobes are employed, turn around the coaxis of the input shaft 28, and the wave generator bearing 31, the flextube 34 and the wave follower bearing 40.

Rotation of the input shaft 28 will cause the inner raceway 30 to rotate and will cause the rolling elements $32^1$, $32^2$ and $32^3$ of the wave generator bearing to turn, progressing a wave around the outer race 33 of the wave generator bearing.

The rotation of this shape in turn causes the various other components to rotate at the same speed that this shape is rotated and eventually the wave follower 44 is compelled to rotate at the angular velocity of the rolling wave generator elements $32^1$, $32^2$ and $32^3$.

Figure 3:
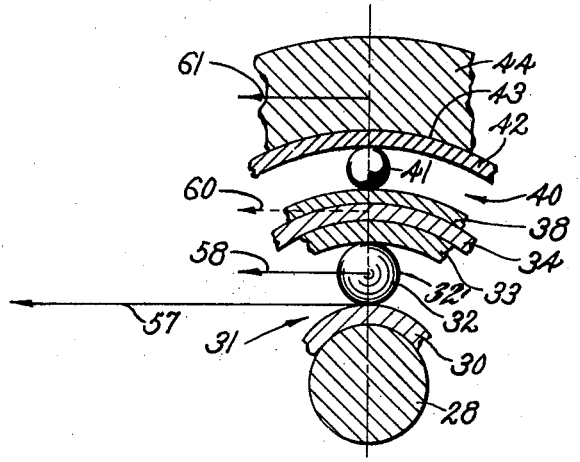
FIGURE 3 is a velocity vector diagram illustrating the motion produced in the device of FIGURES 1 and 2.

FIGURE 3 diagrammatically represents the angular velocity vectors of this particular system. Throughout this discussion the angular velocity of a part is represented by a straight vector line which is a graphical representation of radians per second for each inch of vector length. Accordingly, the length of the vector lines is proportional to the vector velocity. Here it can be seen that the rotation of the inner raceway 30 of the wave generator 31 will cause an angular velocity vector 57. The inner raceway 30 bears a planetary relationship with respect to the rolling elements $32^1$ and the outer raceway 33. The rolling elements $32^1$ will not progress at as high an angular velocity as the inner raceway 30. Applying standard planetary relations, the diameter of the outer race at the rolling elements $32^1$ divided by the diameter of the inner race 30 plus 1 gives the actual ratio of angular velocity between the inner race 30 and the planetary orbiting of the rolling elements $32^1$. The vector for this annular velocity of the rolling elements $32^1$ is illustrated at 58 and it is considerably smaller than the vector 57.

The angular velocity vector 58 (FIGURE 3) represents the angular velocity of the rolling elements $32^1$ considered as planets as they rotate around the inner race or sun 30. Consequently, the progression of the sine wave will be at the same angular velocity as that of the planetary rolling elements $32^1$. The angular velocity vector 60 (FIGURE 3) therefore represents the angular velocity of the wave progression. The angular velocity vector 60 is shown as dotted to differentiate it from the other angular velocity vectors.

Now as previously pointed out, in this particular embodiment the flextube 34 is angularly stationary. What is rotated angularly is the major and minor axis or the shape itself, but the flextube is not rotating. The vectors 57 and 58 however, do represent axial rotation of the parts and not merely of the shape, but the angular velocity vector 60 is different from the others in that it does not represent a net particle progression of the flextube 34, but merely a rotation of a shape. It could not represent a net particle progression because the flextube is splined fast at one end.

Since the interior shape of the wave follower 44 is a matching elliptoidal shape to that of the outer race 42 of the wave generator, the major axis of the wave follower shape will rotate at the same angular velocity as the major axis of the end of the flextube. Therefore, the angular velocity vector 61 of the wave follower is equal in length and direction to the angular velocity vector 60. Again however there is a difference because the angular velocity vector 61 represents actual rotation of the wave follower 44, while the angular velocity vector 60 merely represents rotation of the shape and not of the physical flextube.

Figure 4:
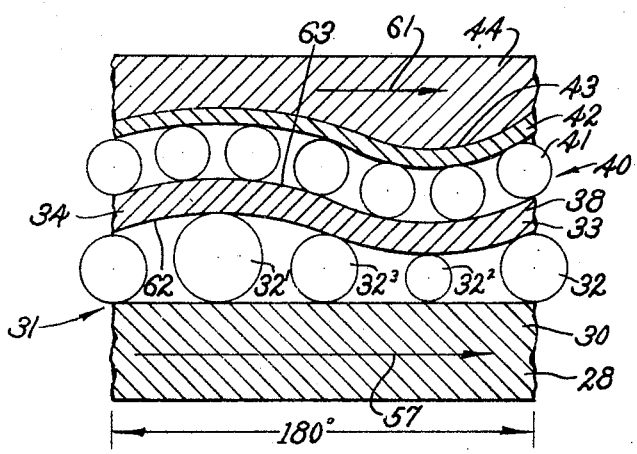
FIGURE 4 is a diagrammatic development showing a single sine wave or 180° of an elliptoidal wave follower, illustrating the relation between the wave generator and a wave follower in the device of FIGURES 1, 2 and 3.

FIGURE 4 illustrates in a simplified diagram the relationship of the various rolling elements. An angle of 180° has been laid open and developed in this view. It will be apparent that one complete sine wave is present in one half of the circumference. The inner race 30 of the wave generator 31 is here illustrated as a straight line and the rolling elements $32^1$, $32^2$ and $32^3$ of various diameters are shown contacting this straight line at one side and conforming to the wave shape at the other side. For convenience in illustration the rolling elements are shown without any bearing cage or bearing separator. In order to simplify, instead of showing three separate elements 33, 34 and 38 with a multiplicity of lines, these three components are shown as one part, the inner portion 62 of which represents the inner contour of the outer race of the wave generator and the outer surface 63 of which represents the outer contour of the inner race 38 of the wave follower bearing.

Here it can be seen that as the wave is sent along in the direction of the arrow 57 it causes the rolling elements $32'$, $32^2$ and $32^3$ to progress the wave shape along the surface 62. Correspondingly the rolling elements 41 of the wave follower bearing cause the outer race 42 of the wave follower bearing 40 which is lying in close contact with the elliptoidal surface 42 on the inside of the wave follower 44 to progress through a distance 61 which is smaller than the distance indicated by the arrow 57.

FIGURE 5 is an analysis of a single rolling element in each of the bearings to illustrate the axial motion that occurs as the inner race 30 of the wave generator bearing 31 is made to progress through a distance represented by the arrow 57. When the flextube 34 is maintained rotationally stationary, it can be seen that as the inner race 30 of the wave generator bearing 31 is moved through a distance equal to the arrow 57, the rolling element $32'$ will advance a distance represented by the arrow 58. In advancing a distance corresponding to the arrow 58 the wave generator rolling element $32'$ will be rolling on one side of the flextube 34 (or the race 33 which conforms to it), and will rotate through a distance angularly corresponding to the arrow 62. As this rolling element $32'$ is rolling into an inclined plane 63, it must of necessity cause a radial deflection of the flextube 34 at this point. This is represented by the radial arrow 64 which shows the distance traveled radially by a point on the flextube 34 when the wave generator rolling element moves through the distance indicated. Throughout FIGURE 5, the initial positions of the various parts are indicated by solid lines and the subsequent positions of the various parts after the inner wave generator race has moved through the distance shown by arrow 57 are illustrated by dotted lines.

As the flextube 34 moves through the radial distance indicated by the radial arrow 64, it of necessity causes the wave follower rolling elements 41 to act against the inner surface 43 of the wave follower 44, and as a result the wave follower will move to the right a distance indicated by the arrow 61. The rolling element 41 will roll through an angle indicated by the arrow 65 and will move to the right a distance indicated by the arrow 66.

It can be seen in FIGURE 5 that the rotation of the inner race of the wave generator will cause a rotation of the wave follower through a lesser distance than the distance through which the wave generator moves.

To guard against misunderstanding, it will be seen that in a developed view as in FIGURE 5 where the radii do not enter into the angular velocity, the velocity indicated by the arrow 61 appears to be half that indicated by the arrow 57.

When however the device is in the circular form and the radius at which the velocity occurs affects the angular velocity, a different ratio is obtained.

For the purpose of design, it will be evident that the ball bearings used in the wave generator and wave follower may be made of suitable ball bearing material, such as a steel usually employed in ball bearings, and the input shaft, flextube and the wave follower will suitably be made of steel or of nonferrous constructional material as required.

One of the unique features of the device is that in order to function in the manner previously described, it is necessary that the flextube 34 remain angularly stationary. If the flextube is free to rotate about the common axis, no motion will be transmitted to the output shaft. This feature can be used as a means of clutching, to start, or stop or modify the ratio between the input shaft and the output shaft.

FIGURE 6 shows a modification of the reverse bell portion of the end bell, by which the spline teeth 35 of the flextube 34, in lieu of engaging the splines 36, engage the inner teeth of annular disks 67 which are respectively interposed for relative rotation between stationary disks 68 which engage by teeth at the outside in stationary spline teeth $36'$ formed on the inside of the end bell. The pack of rotary disks meshing with the flextube and disks secured to the housing is subject to axial pressure between a shoulder 70 on the end bell and an adjustable annular cover plate 71 which is drawn up under the pressure of spring washers 72 by a ring of cap screws 73 threaded into the end bell. The plates are suitably made of frictional clutch material and by increasing the axial pressure the flextube 34 is retarded and may be held angularly stationary.

If desired the pressure on the stack of clutch-like disks can be adjusted so that the flextube 34 will remain stationary until a predetermined torque level within the operating range of the machine is encountered, and then the clutch-like disks 67 will rotatably slide to permit the flextube to turn, thus limiting the output torque which can be transmitted by the device.

Figure 7:
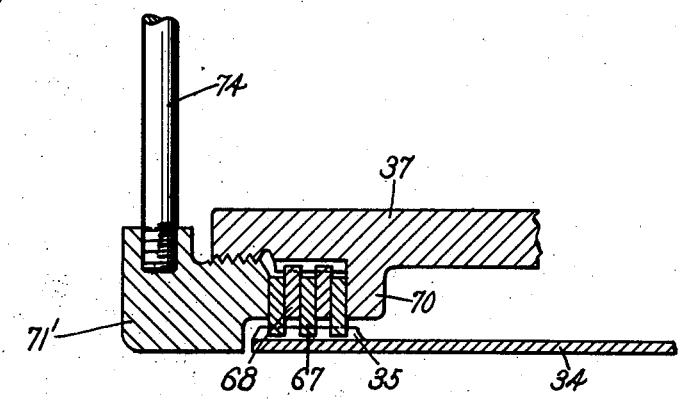
FIGURE 7 is a view similar to FIGURE 6, showing a brake interposed between an anchorage such as the housing and the flextube, the brake being of the type which can be released to allow the flextube to rotate freely or tightened to render the flextube stationary.

FIGURE 7 illustrates as an alternate to the brake setting means indicated in FIG. 6, a readily adjustable form in which, in lieu of the cover 71, the cover 71' is axially threaded into an extension of a reverse bell 37 and can suitably be adjusted to regulate the pressure on the clutch-like discs by rotating it by means of a normally removed handle 74, thus permitting the user to cause the flextube to be held rotationally stationary or to allow the flextube to turn with any desired degree of freedom during operation.

Figure 8:
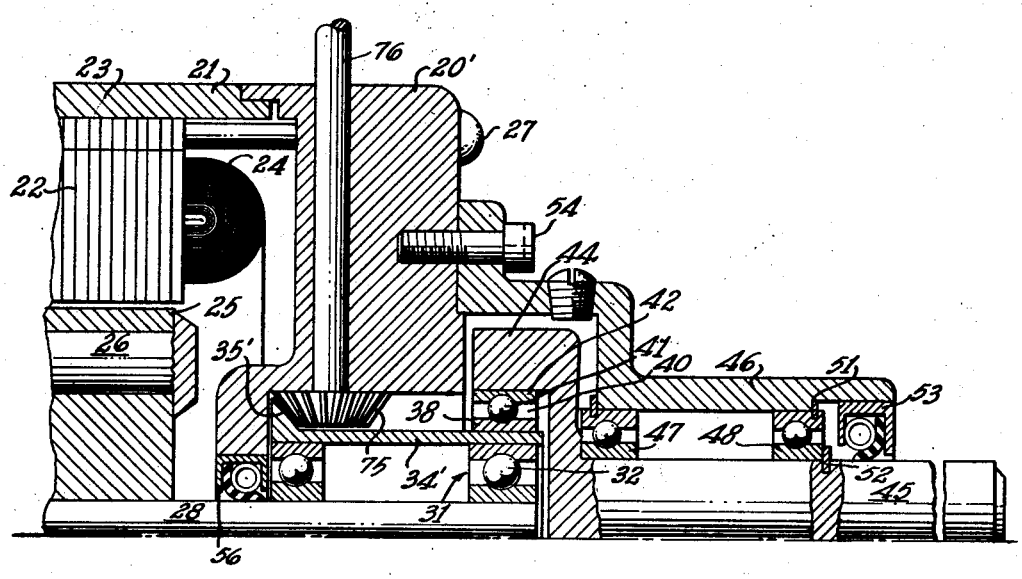
FIGURE 8 is a view similar to FIGURE 6, showing the use of an auxiliary drive to rotate the flextube about the common axis.

In some cases it is desirable to positively drive the flextube, in either direction of motion with respect to the action of the power transmission. Mechanism for accomplishing this is shown in FIGURE 8 where a bevel gear 75 on a driving shaft 76 which is normal to the shaft 28, journalled in the end bell 20' meshes with gear teeth 35' on the outside of the flextube 34' at the end remote from the wave generator, the gear teeth being deep enough so that the spur gear is always in mesh with the gear teeth on the flextube. Any suitable auxiliary drive is provided for the shaft 76.

FIGURE 9 is an anlaysis of the various motions of the parts when the flextube 34 is permitted to angularly rotate or is angularly rotated. For simplification, the combined races and the flextube are illustrated as the element 34. If the flextube 34 is permitted to angularly rotate as the inner race 30 is rotated through a distance indicated by the arrow 57, it will cause the flextube 34 to move to the left an equivalent distance indicated by the arrow 77. As this occurs the rolling elements 32' rotate directly around their central axes 78 through a motion depicted by the arrow 80. In the meantime, as the flextube 34 moves through the distance indicated by the arrow 77, the rolling elements 41 will roll on the inside of the shape 43 of the wave follower 44 through a distance indicated by the arrow 81. As in FIGURE 5, the initial positions of the various component parts are illustrated by solid lines and the positions to which they have moved while the inner race of the wave generator moved through the distance indicated by the arrow 57 are illustrated by dotted lines. Under these conditions it can be seen that no motion occurs at the wave follower 44 and the output shaft 45.

If in FIGURE 9 the flextube is positively driven in the direction of the arrow 77 at a more rapid rate than that indicated by the arrow 77, then of course the motion imparted to the wave follower 44 will be in the direction opposite to that illustrated in FIGURE 5.

If on the other hand the flextube is positively driven in the same direction as that indicated by the arrow 77 but at a less rapid rate, then the motion imparted to the wave follower 44 will be in the same direction as that shown by arrow 61 in FIGURE 5. Hence, variation in the input speed to the flextube can be made to modify, cancel, or change the direction of the output shaft 45.

Figure 10:
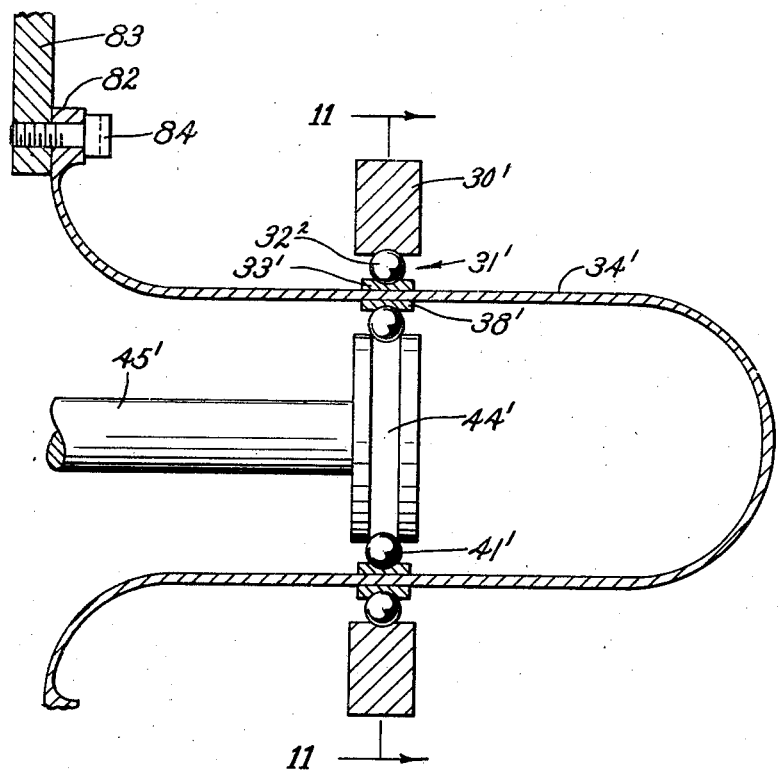
FIGURE 10 is a fragmentary axial section showing an inverted form of the invention in which the flextube acts as a hermetic sealing wall.
Figure 11:
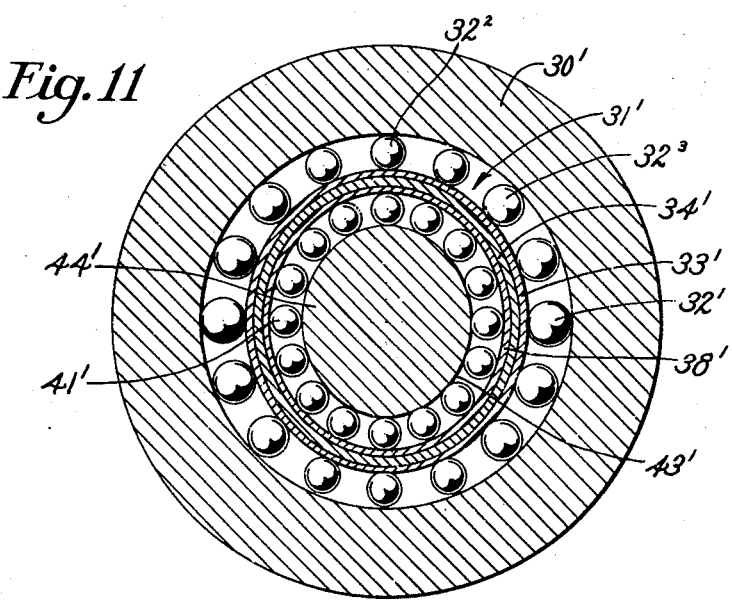
FIGURE 11 is a transverse section on the line 11—11 of FIGURE 10 through the power transmission proper.

It will be evident that the device of the invention can be used in an inverted form with the wave generator on the outside and the wave follower on the inside. This is shown in FIGURES 10 and 11, where a flextube 34' constitutes a hermetic sealing wall of tubular form secured at 82 to a wall 83 of a suitable closed vessel by cap screws 84. Of course the means for sealing between the flextube 34' and the wall of the vessel will vary to suit the requirements.

In this case a wave generator 31' is on the outside of the flextube 34' rather than the inside. The wave generator circular raceway 30' is combined with the wave generator itself and as it rotates it causes the rolling elements 32', $32^2$ and $32^3$ of various different diameters as shown to progress around the race 33' which is of elliptoidal cross section, the minor axis being opposite the rolling elements 32', and the major axis being opposite the rolling elements $32^2$. The flextube 34' is deflected into a suitable non-circular shape, in this case an elliptoid, which in turn deflects the wave follower bearing raceway 38'. Wave follower rolling elements 41' roll on the elliptoidal shape 43' of a wave follower 44' which is mounted on an output shaft 45', causing the wave follower rolling elements 41' to turn at the same speed as the planetary speed of the rolling elements 32', $32^2$ and $32^3$ of the wave generator. As the sine wave rotates the output shaft 45' is turned.

Throughout the previous discussion the wave generator has been provided in its bearing with the circular raceway and the balls of differing diameters, and the wave follower has had the elliptoidal raceway and the balls of uniform diameter. While this is true when the device is used as a speed decreaser, the reverse is true when the device is used as a speed increaser.

Thus in the form of FIGURES 10 and 11, in order to use the device as a speed increaser, the shaft 45' will be an input and the raceway 30' will be the output. The efficiency of the device is such that it can be driven in either direction with equal facility.

In the form of FIGURES 10 and 11 as in the other forms, the separators for the balls of the wave generator and wave follower have not been illustrated or described. They can be of any of the well known types used in standard antifriction rolling element bearings, and hence have been eliminated for the sake of simplicity.

In view of my invention and disclosure variations and modifications to meet individual whim or particular need will doubtless become evident to others skilled in the art, to obtain all or part of the benefits of any invention without copying the structure shown, and I, therefore, claim all such insofar as they fall within the reasonable spirit and scope of my claims.

Having thus described my invention, what I claim as new and desire to secure by Letters Patent is:

1. In a power transmission, a first bearing having bearing rolling elements, a flextube having one radial side engaging one radial side of said first bearing, reaction means engageable with the flextube, and a second bearing having bearing rolling elements and engaging the other radial side of said flextube, either the latter or one of the bearings being operative as an input when the other of the bearings or the flextube transmits a power output, the rolling elements of one of said first and second bearings being of different diameters and propagating a non-circular shape around said flextube by relative rotation of the first and second bearings and the flextube about a common axis with planetary motion of said bearing rolling elements of different diameters.

2. A power transmission of claim 1, in which said bearing rolling elements of different diameters are disposed in elliptoidal form on the inner side over the flextube.

3. A power transmission of claim 1, in which said first and second bearing elements are ball bearings.

4. A power transmission of claim 1, in which said bearings have separate races, the races of the bearing having bearing rolling elements of different diameters being one circular and the other non-circular.

5. A power transmission of claim 1, in which said reaction means is provided for holding said flextube rotationally stationary when one of the bearings serves as an output member, and either the other bearing or the flextube serves as an input member.

6. A power transmission of claim 5, in combination with spline means formed on the flextube and cooperative with the reaction means for holding said flextube rotationally stationary.

7. A power transmission of claim 1, in combination with brake means interposed between said reaction means and said flextube for permitting selective relative rotational release and relative rotational restraint of said flextube.

8. A power transmission of claim 1, characterized by the provision of said reaction means as an anchorage, and a torque limiting device interposed between said anchorage and said flextube.

9. A power transmission of claim 1, in which during at least one phase of operation, said flextube is free to rotate.

10. A power transmission of claim 1, in combination with drive means for rotating said flextube as an input about the common axis.

11. A power transmission of claim 1, in which said bearing rolling elements are balls and said shape is an elliptoid, and said reaction means is adjustable for holding said flextube rotationally stationary.

12. A power transmission of claim 1, in which said bearing rolling elements are balls and said shape is an elliptoid, and said reaction means comprises spline means for holding said flextube rotationally stationary.

13. A power transmission of claim 1, in which said bearing rolling elements are balls and said shape is an elliptoid, in combination with brake means interposed between said reaction means and said flextube.

14. A power transmission of claim 1, in which said bearing rolling elements are balls and said shape is an elliptoid, in which said flextube is free to rotate.

15. A power transmission of claim 1, in which said bearing rolling elements are balls and said shape is an elliptoid, in combination with means for rotating said flextube as an input member about the common axis.

References Cited in the file of this patent
UNITED STATES PATENTS

| | | |
|---|---|---|
| 2,931,249 | Musser | Apr. 5, 1960 |
| 2,943,495 | Musser | July 5, 1960 |
| 3,039,324 | Waterfield | June 19, 1962 |
| 3,049,931 | Lang et al. | Aug. 21, 1962 |